US005645663A

United States Patent [19]

Nakayama et al.

[11] Patent Number: 5,645,663

[45] Date of Patent: Jul. 8, 1997

[54] METHOD OF MANUFACTURING A LUMINOUS SHEET RADIATING FLOURESCENCE UPON IRRADIATION OF ULTRAVIOLET RAYS

[75] Inventors: Takeshi Nakayama; Hidehiko Murayama, both of Tokyo, Japan

[73] Assignees: Lintec Corporation; Nemoto & Co., Ltd., both of Tokyo, Japan

[21] Appl. No.: 691,429

[22] Filed: Aug. 2, 1996

Related U.S. Application Data

[63] Continuation of Ser. No. 365,461, Dec. 28, 1994, abandoned.

[30] Foreign Application Priority Data

Dec. 28, 1993 [JP] Japan .................................... 5-338483

[51] Int. Cl.$^{6}$ .................................................. C09K 11/00

[52] U.S. Cl. ........................... 156/67; 156/246; 156/247; 156/289; 264/21; 264/212; 264/213

[58] Field of Search ............................ 156/67, 246, 247, 156/289; 264/21, 212, 213; 427/157; 428/913; 252/301.16, 301.18, 301.35, 301.5

[56] References Cited

U.S. PATENT DOCUMENTS

| | | | |
|---|---|---|---|
| 2,780,574 | 2/1957 | Ott et al. | 156/246 |
| 3,030,870 | 4/1962 | Gill, Jr. | 252/301.35 |
| 3,320,417 | 5/1967 | Alburger | 252/301.35 |
| 3,377,292 | 4/1968 | Halverson | 252/301.18 |
| 3,990,876 | 11/1976 | Heymes et al. | 156/246 |
| 5,158,703 | 10/1992 | Takuma et al. | 252/301.35 |

FOREIGN PATENT DOCUMENTS

| | | |
|---|---|---|
| 661494 | 7/1995 | European Pat. Off. . |
| 2 311 991 | 12/1976 | France . |
| 2 350 547 | 12/1977 | France . |
| 81/00769 | 3/1981 | WIPO . |

OTHER PUBLICATIONS

English language abstract of FR–A–2 311 991 & FR–A–2 350 547, WPAT Accession No. 76–75729X/41.

*Primary Examiner*—Michael W. Ball
*Assistant Examiner*—Richard Crispino
*Attorney, Agent, or Firm*—Armstrong, Westerman, Hattori, McLeland & Naughton

[57] ABSTRACT

A method of manufacturing a luminous sheet according to the present invention enables a planar display unit radiating fluorescence upon irradiation of ultraviolet rays to be easily offered. A ability of radiating fluorescence is also increased. To this end, an ultraviolet-excited luminous material is applied and dried over a film-like base sheet 10 to form a light emitting layer 20, and a resin solution is applied and dried over an upper surface of the light-emitting layer to form a back layer 40. After thus forming the light-emitting layer 20 and the back layer 40 into a one-piece body, the base sheet 10 is peeled off from the light-emitting layer 20. The specific gravity of the fluorescent material is selected to be three times or more the specific gravity of the resin solution used for forming the ultraviolet-excited luminous material.

4 Claims, 1 Drawing Sheet

METHOD OF MANUFACTURING A LUMINOUS SHEET RADIATING FLOURESCENCE UPON IRRADIATION OF ULTRAVIOLET RAYS

This application is a continuation of application Ser. No. 08/365,461 filed Dec. 28, 1994, now abandoned.

BACKGROUND OF THE INVENTION

1. Field of the Invention

The present invention relates to a method of manufacturing a luminous sheet radiating fluorescence upon irradiation of ultraviolet rays, and more particularly to a method of manufacturing a luminous sheet which has a double-layered structure comprised of a light emitting layer containing a fluorescent material therein and a back layer, the back layer of the luminous sheet being fixed to a certain location where ultraviolet rays are irradiated to the light emitting layer on the front side, thereby easily providing a planar fluorescent display unit.

2. Description of the Related Art

Heretofore, it has been customary to draw pictures, characters or the like by using a mixture of a fluorescent material and an appropriate binder, and irradiating ultraviolet rays to the mixture so that fluorescence is radiated to present a variety of display.

Such a conventional method is usually practiced by preparing an ultraviolet-excited luminous material in which a powder pigment of fluorescent material is dispersed in screen ink made of primarily a colorless, transparent acrylic resin or ink made of primarily a colorless, transparent epoxy resin in a ratio of 2:1 by weight, coating the material on a signboard or the like by screen printing, spray printing or brush painting, and then drying the coated material for about 15 minutes at 60° C. to make the material fixed in place.

In other words, the conventional method has had disadvantages of requiring a plate for screen printing, entailing a drying time, and needing a skill for spray printing or brush painting.

OBJECT AND SUMMARY OF THE INVENTION

An object of the present invention is to provide a method of manufacturing a luminous sheet by which the luminous sheet is manufactured beforehand using an ultraviolet-excited luminous material, the luminous sheet being cut into a certain shape and fixed onto a signboard or the like, enabling a planar display unit radiating fluorescence upon irradiation of ultraviolet rays to be easily offered, while eliminating the needs of a plate for screen printing, a drying time in the field, and various skilled operations.

In the process of manufacturing the luminous sheet using the ultraviolet-excited luminous material, because a fluorescent material and a resin solution both making up the ultraviolet-excited luminous material are different in specific gravity from each other, the fluorescent material having larger specific gravity is precipitated in the resin solution. Accordingly, ultraviolet rays are hard to reach the fluorescent and hence the radiated fluorescence is hard to reach the exterior.

Another object of the present invention is, therefore, to increase an ability of radiating fluorescence by causing the fluorescent material to precipitate in the front side of the luminous sheet even if occurs.

To achieve the above objects, according to the present invention, an ultraviolet-excited luminous material, which is a mixture of a fluorescent material and a resin solution and can radiate fluorescence upon irradiation of ultraviolet rays, is applied and dried over a film-like base sheet to form a light emitting layer, a resin solution is applied and dried over an upper surface of the light emitting layer to form a back layer such that the light emitting layer and the back layer become a one-piece body, and the base sheet is then peeled off from the light-emitting layer.

Alternatively, according to the present invention, an ultraviolet-excited luminous material, which is a mixture of a fluorescent material and a resin solution and can radiate fluorescence upon irradiation of ultraviolet rays, is applied and dried over a film-like base sheet to form a light emitting layer, a resin solution is applied and dried over an upper surface of the light emitting layer to form a back layer such that the light emitting layer and the back layer become a one-piece body, an adhesive layer and a release liner are laminated over an upper surface of the back layer, and the base sheet is then peeled off from the light-emitting layer.

Further, according to the present invention, the specific gravity of the fluorescent material is selected to be three times or more the specific gravity of the resin solution which is a mixture of a resin and a solvent.

Hereinafter, the method of manufacturing the luminous sheet radiating fluorescence upon irradiation of ultraviolet rays according to the present invention will be described with reference to a manufacturing apparatus shown in FIG. 1.

First, in order to ensure smoothness of the surface of a light emitting layer, a film-like base sheet 10 whose at least one surface has superior smoothness is prepared.

A sheet film called a casting film can be used as the base sheet 10. One practically usable example is a film formed by coating silicone over one surface of a polyester film to make the film more easily peelable.

The base sheet 10 is wound into a roll beforehand.

While a film formed by coating silicone over one surface of a polyester film is used as the base sheet 10 in the above description, any other suitable sheet, e.g., a sheet formed by laminating polyethylene over a paper base and then coating silicone over the surface of the laminated polyethylene, so long as it is satisfactory in terms of peel-off and mirror surface. The thickness of the base sheet 10 is suitably in the range of 25 to 250 μm, if a polyester film is employed, taking into account operability and strength.

On the other hand, a fluorescent material and a resin solution are mixed with each other to prepare an ultraviolet-excited luminous material.

The fluorescent material used herein includes the following examples for different colors of fluorescence radiated:

white—trade names ALN-B, YS-A, HG-A by Nemoto & Co., Ltd.
orange—trade names YS-A, HG-A by Nemoto Co., Ltd.
blue—trade name ALN-B by Nemoto & Co., Ltd.
red—trade name YS-A by Nemoto & Co., Ltd.
green—trade names HG-A by Nemoto & Co., Ltd.

As to the resin, usable examples include, e.g., a polyurethane resin diluted with methyl ethyl ketone or dimethyl formamide as a solvent.

The resin and the fluorescent material are mixed with each other while a solvent is added in a proper amount, so that respective coating amounts (in a dry state) are;

| | |
|---|---|
| fluorescent material | 10–40 g/m2 |
| polyurethane resin | 10–50 g/m2 |

whereby the ultraviolet-excited luminous material is obtained.

Specific gravities of the components making up the ultraviolet-excited luminous material are below:

| | |
|---|---|
| fluorescent material | 3.6–5.1 |
| polyurethane resin | approx. 1.3 |
| solvent | approx. 0.8 |

Since the resin solution as a mixture of the polyurethane resin and the solvent has specific gravity of about 1, the specific gravity of the fluorescent material is three times or more that of the resin solution.

Accordingly, while the fluorescent material is dispersed in the resin solution under kneading, the fluorescent material is precipitated in the resin solution after the end of the kneading. Here, the fluorescent material and the resin solution are related to each other such that the specific gravity of the fluorescent material is in the range of 3.1 to 4.4 with respect to that of the resin solution. As a result of carrying out experiments using other resins and fluorescent materials which have different values of specific gravity, it has been found that, though depending on viscosity, etc., the fluorescent materials are apt to easily precipitate when the specific gravity of the fluorescent materials is selected to be three times or more that of the resin solution mixed to make up the ultraviolet-excited luminous material.

While the above description is made as using, e.g., a polyurethane resin as the resin to be mixed, any other suitable resin such as vinyl chloride or acrylate, which is sufficiently resistant against weather, can also be used. Further, the resin employed herein may be made of other materials so long as they satisfy the requirements of not absorbing ultraviolet rays, allowing fluorescence to transmit therethrough, and having the appropriate mechanical strength. Additionally, a coloring agent, a plasticizer, etc. can also be mixed as needed.

Then, the base sheet 10 is unwound successively to pass a coater head 30 with its silicone coated surface facing upward. The coater head 30 applies the ultraviolet-excited luminous material to the silicone coated surface of the base sheet 10.

The base sheet 10 is then fed to pass through a high-temperature oven 35 in which temperature is gradually increased along the path. During passage through the oven 35, the ultraviolet-excited luminous material coated by the coater head 30 is dried and fixed onto the base sheet 10 while the solvent is evaporated, thereby forming a light emitting layer 20.

The coater used herein is not particularly limited, but can be suitably selected from among generally available coaters for practical use.

In the ultraviolet-excited luminous material coated on the base sheet 10, the fluorescent material is dispersed in the polyurethane resin and the solvent under kneading, but are precipitated in the polyurethane resin and the solvent after the end of the kneading. The drying time should be determined while observing a state of actually radiated fluorescence because it depends on the difference in specific gravity between the fluorescent material and the resin solution, viscosity of the solution, drying conditions and so on.

The light emitting layer 20 dried and fixed onto the base sheet 10 has a thickness of about 30 µm. If the thickness of the light emitting layer 20 is too small, a light emitting ability would be reduced, and if it is too large, this would be uneconomical. Therefore, the preferable thickness range is from 20 to 40 µm.

After the light emitting layer 20 has thus been formed by coating and fixing the ultraviolet-excited luminous material onto the base sheet 10, the base sheet 10 including the light emitting layer 20 fixed thereto is wound up.

Subsequently, a back layer 40 is formed by coating and drying a resin solution which is a mixture of a resin and a solvent.

The back layer 40 can be formed by using, e.g., a polyurethane resin mixed with a solvent beforehand. If the resin solution containing only a polyurethane resin is used, the formed back layer 40 becomes transparent.

Therefore, when it is desired to form the back layer 40 in white color, for example, a white inorganic pigment such as titanium oxide, lithopone, white carbon or calcium carbonate is added along with the solvent to the polyurethane resin, thereby preparing a resin solution from which the back layer 40 is formed.

It is also possible to form the back layer 40 in the same color as that of radiated fluorescence. In this case, a weather-resistant pigment in the desired color is added along with the solvent to the polyurethane resin, thereby preparing a resin solution from which the back layer 40 is formed.

After preparing the resin solution for the back layer 40, the rolled-up base sheet 10 including the light-emitting layer formed thereon is unwound successively with its silicone coated surface facing upward, and the above-prepared resin solution is applied by the coater head 30 onto the light emitting layer of the base sheet 10.

During passage through the high-temperature oven 35 in which temperature is gradually increased along the path, the resin solution coated by the coater head 30 is dried and fixed onto the light emitting layer 20 while the solvent is evaporated, thereby forming the back layer 40.

The back layer 40 dried and fixed onto the light emitting layer 20 has a thickness of about 40 µm. If the thickness of the back layer 40 is too small, the strength would be reduced, and if it is too large, this would be uneconomical. Therefore, the preferable thickness range is from 20 to 60 µm.

The base sheet 10 thus formed by fixing the back layer 40 to the base sheet 10, which includes the light emitting layer 20 fixed thereto is then wound up again.

After fixing the light emitting layer 20 and the back layer 40 onto the base sheet 10, as shown in FIG. 2, the base sheet 10 is peeled off from the light emitting layer 20 and the back layer 40 to thereby manufacture a luminous sheet radiating fluorescence upon irradiation of ultraviolet rays.

When actually using the luminous sheet manufactured as described above, the light emitting layer 20 and the back layer 40 in a one-piece body are cut into a certain shape and are stuck at the side of the back layer 40 to a certain signboard or the like.

With the above manufacture method, the luminous sheet is manufactured beforehand using the ultraviolet-excited luminous material, the luminous sheet being cut into a certain shape and fixed onto a signboard or the like, enabling a planar display unit radiating fluorescence upon irradiation of ultraviolet rays to be easily offered, while eliminating the needs of a plate for screen printing, a drying time in the field, and various skilled operations.

Further, in the ultraviolet-excited luminous material coated on the base sheet 10, the fluorescent material is dispersed in the polyurethane resin and the solvent under kneading, but are precipitated in the polyurethane resin and the solvent after the end of the kneading.

As a result of the precipitation, the fluorescent material is present rich in the ultraviolet-excited luminous material on the side near the base sheet 10. In the light emitting layer 20 in a completely dried state, therefore, the fluorescent material is present rich on the side near the base sheet 10.

The back layer 40 is formed on the light emitting layer 20 under the above condition on the opposite side to the base sheet 10 and, in practical use, the back layer 40 is fixed to a signboard or The like on the opposite side to the light emitting layer 20.

Accordingly, the luminous sheet radiating fluorescence in the planar form according to the present invention can emit a sufficient amount of light even when an absolute amount of the fluorescent material in the ultraviolet-excited luminous material is small.

As an alternative, the luminous sheet of the present invention may be manufactured as shown in FIG. 3. The rolled-up base sheet 10, which includes the light emitting layer 20 formed by coating and fixing the ultraviolet-excited luminous material thereto, is unwound successively with the light emitting layer facing upward, and the above-mentioned resin solution is applied and fixed by the coater head 30 onto the light emitting layer 20 of the base sheet 10, thereby forming the back layer 40 as with the above case. After that, an adhesive layer 50 and release liner 55 are laminated on the surface of the back layer 40, followed by peeling off the base sheet 10 from the light emitting layer 20.

With such an arrangement, the luminous sheet can be more easily stuck to a signboard or the like by cutting a one-piece body of the light emitting layer 20, the back layer 40, the adhesive layer 50 and the release liner 55 into a certain shape, peeling off the release liner 55 as shown in FIG. 3, and then fixing the adhesive layer 50 to the signboard or the like.

As an adhesive to form the adhesive layer 50, any of various adhesives such as based on acrylate, silicone, synthetic rubber or natural rubber can be used.

The luminous sheet radiating fluorescence in the planar form according to the present invention can be practically excited to emit light by using an ultraviolet lamp in the wavelength range of 300 to 400 nm, e.g., an ultraviolet lamp BL-B, 15 W manufactured by Matsushita Electric Industrial Co., Ltd.

Apart from the above description, the ultraviolet-excited luminous material may be applied and fixed onto the base sheet 10 by an other coating method than explained above, or printing. In this case, the thickness of the applied luminous material, i.e., of the light emitting layer 20, can be selected to fall in the range of 4 to 10 μm.

DETAILED DESCRIPTION OF THE PREFERRED EMBODIMENTS

Figure 1:
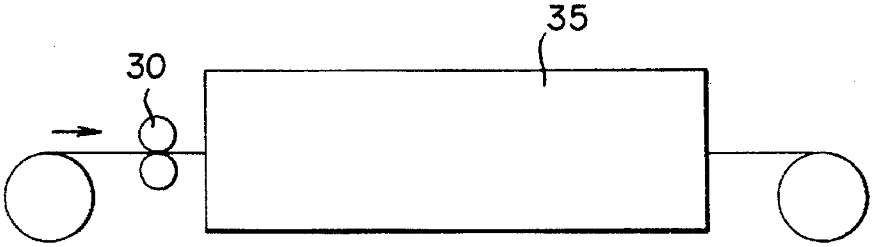
FIG. 1 is a schematic view of a manufacturing apparatus.
Figure 2:
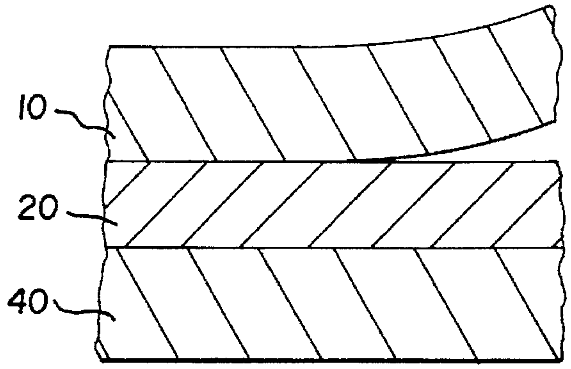
FIG. 2 is a sectional view showing one example of a luminous sheet radiating fluorescence in the planar form.
Figure 3:
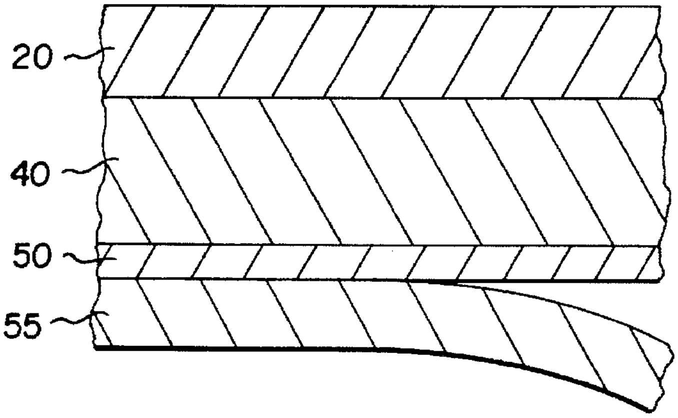
FIG. 3 is a sectional view showing another example of a luminous sheet radiating fluorescence in the planar form.

Preferred embodiments of the present invention will be hereinafter described in connection with practical examples.

EXAMPLE 1

| | |
|---|---|
| Ultraviolet-excited luminous material | |
| polyurethane resin (Sanyo Chemical Industries Co., Ltd.: Sunprene IB-582) | 100 weight parts (solid) |
| fluorescent pigment (Nemoto & Co., Ltd.: YS-A) | 100 weight parts (solid) |
| solvent (IPA:toluene = 1:4) | 40 weight parts |
| Back layer | |
| polyurethane resin (Sanyo Chemical Industries Co., Ltd.: Sunprene IB-582) | |

First, the polyurethane resin, the fluorescent pigment and the solvent were kneaded together by using a kneader and were forced to release air bubbles, thereby preparing the ultraviolet-excited luminous material.

Then, a casting film comprising a polyester film having a thickness of 50 μm and coated with a silicone resin over its one surface was used as a base sheet, and the ultraviolet-excited luminous material was applied onto the silicone-coated surface of the base sheet by an applicator to have a thickness of about 30 μm (dry), followed by drying for 10 minutes at 100° C. to evaporate the solvent, thereby forming the light emitting layer.

Over the light emitting layer, the resin solution was applied by an applicator to have a thickness of about 40 μm (dry), followed by drying for 10 minutes at 100° C., thereby forming the back layer.

Subsequently, the light emitting layer and the back layer in a one-piece body were peeled off from the base sheet, thereby manufacturing the luminous sheet radiating fluorescence upon irradiation of ultraviolet rays.

It was confirmed that the light emitting layer of the resultant luminous sheet radiates fluorescence upon irradiation of ultraviolet rays from any one of the front and rear sides of the light emitting layer, because the back layer is transparent. However, the radiation of fluorescence was superior in the case of irradiating ultraviolet rays from the front side of the light emitting layer to that in the case of irradiating ultraviolet rays from the rear side. It is believed that the above result is attributable to the fluorescent material precipitating in the region of the light emitting layer near its front surface.

EXAMPLE 2

| | |
|---|---|
| Ultraviolet-excited luminous material | |
| polyurethane resin (Sanyo Chemical Industries Co., Ltd.: Sunprene IB-582) | 100 weight parts (solid) |
| fluorescent pigment (solid) (Nemoto & Co., Ltd.: YS-A) | 100 weight parts |
| solvent (IPA:toluene 1:4) | 40 weight parts (solid) |
| Back layer | |
| polyurethane resin (Sanyo Chemical Industries Co., Ltd.: Sunprene IB-582) | 100 weight parts (solid) |
| white pigment (Sakai Chemical Co., Ltd.: Titanium White A-150) | 80 weight parts (solid) |
| solvent (IPA:toluene = 1:4) | 40 weight parts |

First, the polyurethane resin, the fluorescent pigment and the solvent were kneaded together by using a kneader and were forced to release air bubbles, thereby preparing the ultraviolet-excited luminous material.

Also, the polyurethane resin, the white pigment and the solvent were kneaded together by using a kneader and were forced to release air bubbles, thereby preparing the resin solution to form the back layer.

Then, a casting film comprising a polyester film having a thickness of 50 μm and coated with a silicone resin over its one surface was used as a base sheet, and the ultraviolet-excited luminous material was applied onto the silicone-coated surface of the base sheet by an applicator to have a thickness of about 30 μm (dry), followed by drying for 10 minutes at 100° C. to evaporate the solvent, thereby forming the light emitting layer.

Over the light emitting layer, the resin solution was applied by an applicator to have a thickness of about 40 μm (dry), followed by drying for 10 minutes at 100° C., thereby forming the back layer.

Subsequently, the light emitting layer and the back layer in a one-piece body were peeled off from the base sheet, thereby manufacturing the luminous sheet radiating fluorescence upon irradiation of ultraviolet rays.

It was confirmed that the resultant luminous sheet radiates fluorescence satisfactorily upon irradiation of ultraviolet rays from the front side of the light emitting layer.

EXAMPLE 3

| | |
|---|---|
| Ultraviolet-excited luminous material | |
| polyurethane resin (Sanyo Chemical Industries Co., Ltd.: Sunprene IB-582) | 100 weight parts (solid) |
| fluorescent pigment (Nemoto & Co., Ltd.: YS-A) | 100 weight parts (solid) |
| solvent (IPA:toluene = 1:4) | 40 weight parts |
| Back layer | |
| polyurethane resin (Sanyo Chemical Industries Co., Ltd.: Sunprene IB-582) | 100 weight parts (solid) |
| colored organic pigment (Dainichiseika Colour & Chemical Mfg. Co., Ltd.: Myflex E-9127 Red) | 20 weight parts (solid) |

First, the polyurethane resin, the fluorescent pigment and the solvent were kneaded together by using a kneader and were forced to release air bubbles, thereby preparing the ultraviolet-excited luminous material.

Also, the polyurethane resin and the colored organic pigment were kneaded together by using a kneader and were forced to release air bubbles, thereby preparing the resin solution to form the back layer.

Then, a casting film comprising a polyester film having a thickness of 50 μm and coated with a silicone resin over its one surface was used as a base sheet, and the ultraviolet-excited luminous material was applied onto the silicone-coated surface of the base sheet by an applicator to have a thickness of about 30 μm (dry), followed by drying for 10 minutes at 100° C. to evaporate the solvent, thereby forming the light emitting layer.

Over the light emitting layer, the resin solution for the back layer was applied by an applicator to have a thickness of about 40 μm (dry), followed by drying for 10 minutes at 100° C., thereby forming the back layer.

Subsequently, the light emitting layer and the back layer in a one-piece body were peeled off from the base sheet, thereby manufacturing the luminous sheet radiating fluorescence upon irradiation of ultraviolet rays.

It was confirmed that the resultant luminous sheet radiates fluorescence satisfactorily upon irradiation of ultraviolet rays from the front side of the light emitting layer.

EXAMPLE 4

| | |
|---|---|
| Ultraviolet-excited luminous material | |
| polyurethane resin (Sanyo Chemical Industries Co., Ltd.: Sunprene IB-582) | 100 weight parts (solid) |
| fluorescent pigment (Nemoto & Co., Ltd.: YS-A) | 100 weight parts (solid) |
| solvent (IPA:toluene = 1:4) | 40 weight parts |
| Back layer | |
| polyurethane resin (Sanyo Chemical Industries Co., Ltd.: Sunprene IB-582) | 100 weight parts (solid) |
| white pigment (Sakai Chemical Co., Ltd.: Titanium White A-150) | 80 weight parts (solid) |
| solvent (IPA:toluene = 1:4) | 40 weight parts |
| Adhesive layer | |
| acrylic adhesive (Toyo Ink Mfg. Co., Ltd.: Olipine BPS-1109) | 100 weight parts |
| crosslinking agent (Toyo Ink Mfg. Co., Ltd.: Olipine BHS-8515) | 2 weight parts |

First, the polyurethane resin, the fluorescent pigment and the solvent were kneaded together by using a kneader and were forced to release air bubbles, thereby preparing the ultraviolet-excited luminous material.

Also, the polyurethane resin, the white pigment and the solvent were kneaded together by using a kneader and were forced to release air bubbles, thereby preparing the resin solution to form the back layer.

Then, a casting film comprising a polyester film having a thickness of 50 μm and coated with a silicone resin over its one surface was used as a base sheet, and the ultraviolet-excited luminous material was applied onto the silicone-coated surface of the base sheet by an applicator to have a thickness of about 30 μm (dry), followed by drying for 10 minutes at 100° C. to evaporate the solvent, thereby forming the light emitting layer.

Over the light emitting layer, the resin solution for the back layer was applied by an applicator to have a thickness of about 40 μm (dry), followed by drying for 10 minutes at 100° C., thereby forming the back layer.

On the other hand, a mixture of the acrylic adhesive and the crosslinking agent was applied onto a release liner, which was fabricated by laminating polyethylene over paper and coating a silicone resin thereon, by an applicator to have a thickness of about 30 μm (dry), followed by drying for 3 minutes at 100° C., thereby forming the release liner having the adhesive layer.

Then, the release liner having the adhesive layer is stuck at the side of the adhesive layer to the back layer.

Subsequently, the light emitting layer and the back layer in a one-piece body were peeled off from the base sheet, thereby manufacturing the luminous sheet radiating fluorescence upon irradiation of ultraviolet rays.

The resultant luminous sheet was stuck at the adhesive layer to a signboard or the like after peeling off the release liner. Thereafter, it was confirmed that the luminous sheet radiates fluorescence satisfactorily upon irradiation of ultraviolet rays from the front side of the light emitting layer.

Comparative Example

| | |
|---|---|
| Ultraviolet-excited luminous material | |
| polyurethane resin (Sanyo Chemical Industries Co., Ltd.: Sunprene IB-582) | 100 weight parts (solid) |
| fluorescent pigment (Nemoto & Co., Ltd.: YS-A) | 100 weight parts (solid) |
| solvent (IPA:toluene = 1:4) | 40 weight parts |
| Back layer | |
| polyurethane resin (Sanyo Chemical Industries Co., Ltd.: Sunprene IB-582) | 100 weight parts (solid) |
| white pigment (Sakai Chemical Co., Ltd.: Titanium White A-150) | 80 weight parts (solid) |
| solvent (IPA:toluene = 1:4) | 40 weight parts |

First, the polyurethane resin, the fluorescent pigment and the solvent were kneaded together by using a kneader and were forced to release air bubbles, thereby preparing the ultraviolet-excited luminous material.

Also, the polyurethane resin, the white pigment and the solvent were kneaded together by using a kneader and were forced to release air bubbles, thereby preparing the resin solution to form the back layer.

Then, a casting film comprising a polyester film having a thickness of 50 μm and coated with a silicone resin over its one surface was used as a base sheet, and the resin solution for the back layer was applied onto the silicone-coated surface of the base sheet by an applicator to have a thickness of about 40 μm (dry), followed by drying for 10 minutes at 100° C., thereby forming the back layer.

Over the back layer, the ultraviolet-excited luminous material was applied by an applicator to have a thickness of about 30 μm (dry), followed by drying for 10 minutes at 100° C. to evaporate the solvent, thereby forming the light emitting layer.

Subsequently, the light emitting layer and the back layer in a one-piece body were peeled off from the base sheet, thereby manufacturing a luminous sheet radiating fluorescence upon irradiation of ultraviolet rays.

It was confirmed that the resultant luminous sheet radiates fluorescence upon irradiation of ultraviolet rays from the front side of the light emitting layer, but the intensity of radiated fluorescence is inferior to that obtained in Example 2. It is believed that the above result is attributable to the fluorescent material precipitating in the region of the light emitting layer near its rear surface facing the back layer.

Note that above Examples described in this specification are given by way of example only and should not be taken in a limiting sense. The scope of the invention is set forth in the appended claims, and all of modifications made without departing from the scope defined by the claims are involved in the invention.

What is claimed is:

1. A method of manufacturing a luminous sheet radiating fluorescence upon irradiation of ultraviolet rays comprising the steps of: applying an ultraviolet-excited luminous material, which is a mixture of a fluorescent material and a resin solution and can radiate fluorescence upon irradiation of ultraviolet rays, wherein the specific gravity of said fluorescent material is selected to be three times or more the specific gravity of said resin solution which is a mixture of a resin and a solvent; and drying said ultraviolet-excited luminous material over a base sheet to form a light emitting layer; applying a resin solution and drying over an upper surface of said light-emitting layer to form a back layer such that said light-emitting layer and said back layer become a one-piece body; and peeling said base sheet off from said light-emitting layer.

2. The method of claim 1, wherein said back layer further comprises a white pigment or a colored organic pigment.

3. A method of manufacturing a luminous sheet radiating fluorescence upon irradiation of ultraviolet rays comprising the steps of: applying an ultraviolet-excited luminous material, which is a mixture of a fluorescent material and a resin solution and can radiate fluorescence upon irradiation of ultraviolet rays, wherein the specific gravity of said fluorescent material is selected to be three times or more the specific gravity of said resin solution which is a mixture of a resin and a solvent; drying said ultraviolet-excited luminous material over a base sheet to form a light-emitting layer; applying a resin solution and drying over an upper surface of said light-emitting layer to form a back layer such that said light-emitting layer and said back layer become a one-piece body; laminating an adhesive layer and a release liner over an upper surface of said back layer; and peeling said base sheet off from said light-emitting layer.

4. The method of claim 3, wherein said back layer further comprises a white pigment or a colored organic pigment.

* * * * *